L. M. MAXHAM.
AUTOMOBILE LIFE GUARD.
APPLICATION FILED JULY 7, 1919.

1,332,134.

Patented Feb. 24, 1920.
2 SHEETS—SHEET 1.

Inventor,

Lowell Mason Maxham;
By
A. B. Upham,
Attorney.

L. M. MAXHAM.
AUTOMOBILE LIFE GUARD.
APPLICATION FILED JULY 7, 1919.

1,332,134.

Patented Feb. 24, 1920.
2 SHEETS—SHEET 2.

Inventor,
Lowell Mason Maxham;
By
A. V. Blepham,
Attorney.

UNITED STATES PATENT OFFICE.

LOWELL MASON MAXHAM, OF BOSTON, MASSACHUSETTS.

AUTOMOBILE LIFE-GUARD.

1,332,134.　　　　Specification of Letters Patent.　　Patented Feb. 24, 1920.

Application filed July 7, 1919. Serial No. 308,947.

*To all whom it may concern:*

Be it known that I, LOWELL MASON MAXHAM, a citizen of the United States, and a resident of the city of Boston, in the county of Suffolk and Commonwealth of Massachusetts, have invented certain new and useful Improvements in Automobile Life-Guards, of which the following is a specification.

The object of this invention is to provide a simple means for reducing the fatal accidents and serious injuries to persons caught in the pathway of power vehicles operating in such numbers on our streets and highways. To this end I provide a life guard designed to be supported in front of the automobile or other power vehicle, normally out of contact with the roadway but adapted instantly to be dropped to the ground either or both automatically and manually.

In carrying out my invention I provide a single vertically supported standard at the front of the vehicle midway of the wheels thereof, and a life guard supported by said standard to rise and fall but not to turn, the life guard extending laterally to points in front of the wheels, and having a releasable locking device for holding the life guard in its elevated position.

Figure 1:
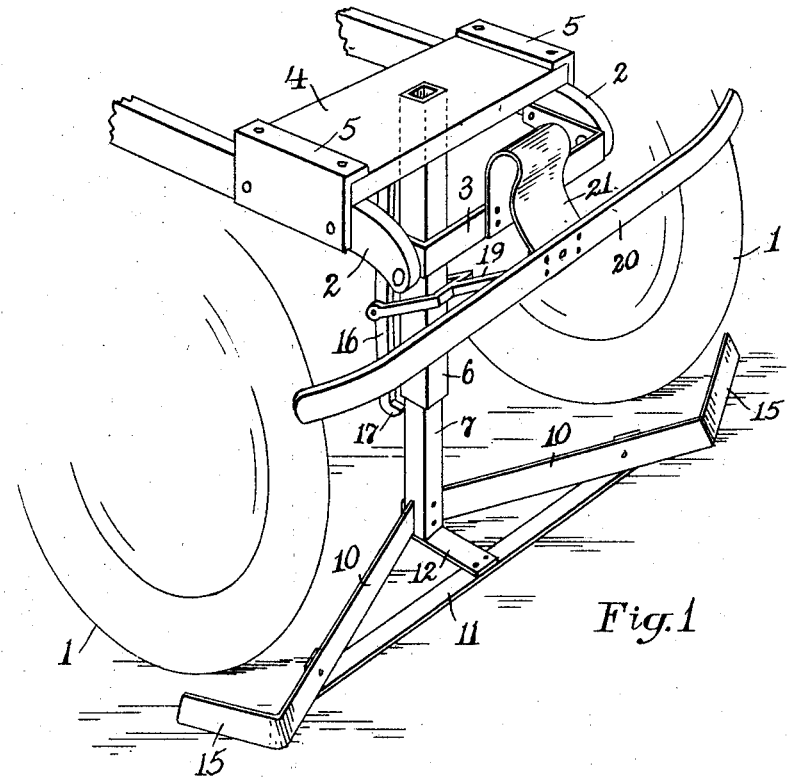
Figure 2:
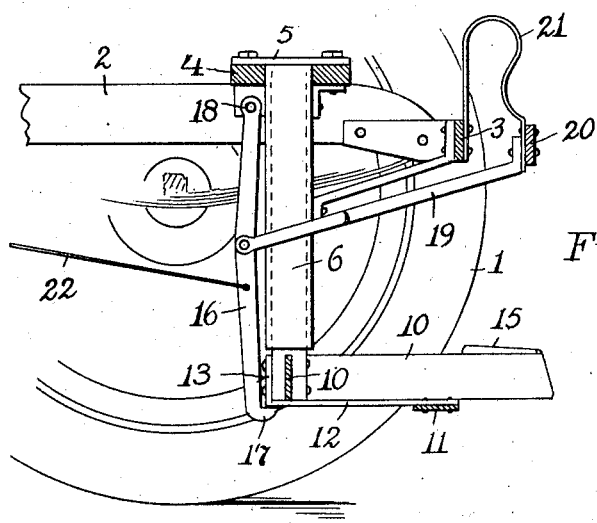
Figure 4:
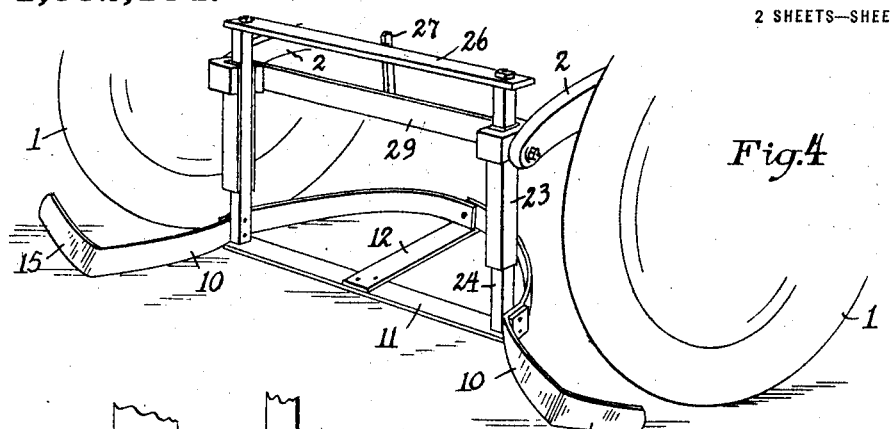
Figure 5:
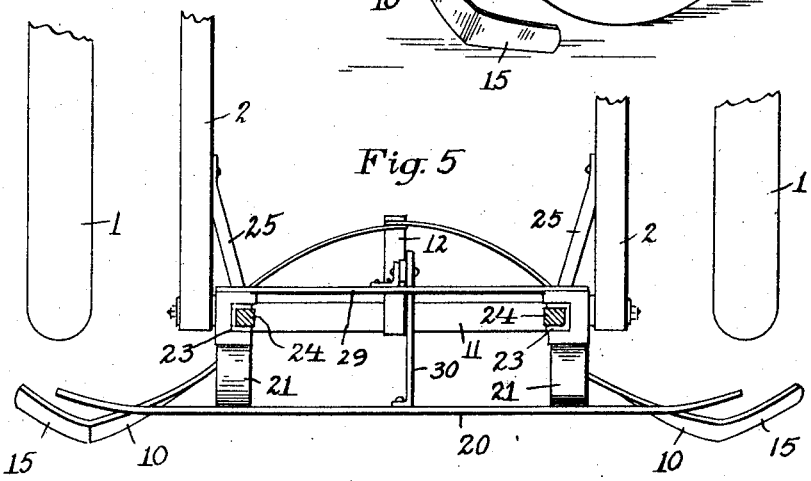
Figure 3:
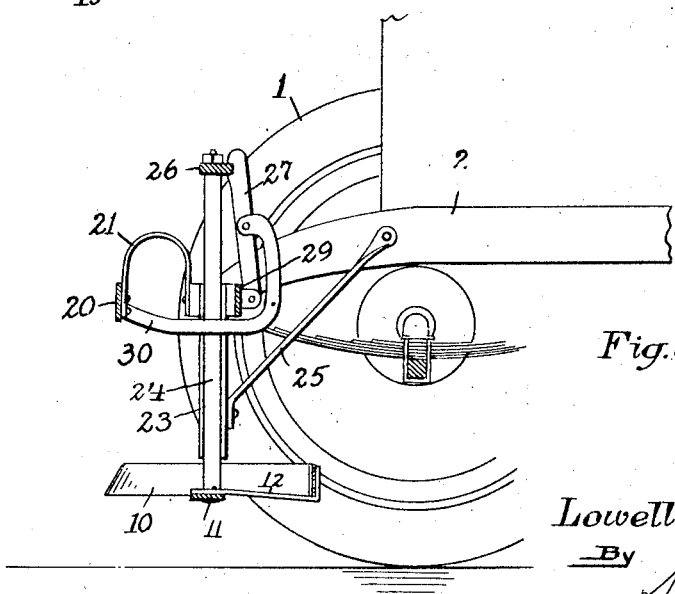

In the drawings forming part of this specification, Figure 1 is a perspective view of a life guard embodying my improvements, carried by a vehicle. Fig. 2 is a side sectional view of the same. Fig. 3 is a side sectional view of another form thereof. Fig. 4 is a perspective view of the latter. Fig. 5 is a sectional plan view thereof.

In the preferred form of my invention, that illustrated in Figs. 1 and 2, the reference character 1 designates the front wheels of a power vehicle, and 2 the front ends of the chassis frame. From the end of one frame beam 2 to the end of the other extends a supporting bar 3, and a short distance back thereof is a cross member preferably of planking 4 strongly clamped to the beams 2 by suitable bolts and angle irons 5.

Rigidly attached to and depending from the center of the cross member 4 is a tubular standard preferably square in cross section, this standard 6 passing up through the member 4, and having a square bar 7 fitting therein to slide vertically but not to turn. To the lower end of the bar 7 is attached the life guard proper comprising the members 10, 11 and 12. The members or arms 10 are preferably integral and pass through a vertical slot cut in the end of the bar 7; the member or tie-bar 11 is attached at its ends to intermediate points of the arms 10, and the member or strap 12 is attached at its front end to the midlength of the tie-bar 11, and at its rear end to the bar 7. For the latter fastening, the strap is provided with an elbow 13 attached by rivets or bolts to the rear of the bar, such rivets or bolts serving also to fasten the arms to the bar.

As shown in Fig. 1, the arms 10, while substantially horizontal, are advanced obliquely forward to points in front of the wheels 1. Each arm is at this point given an oblique rearward bend or elbow 15 thereby presenting a blunt V-shaped guard to each wheel. Preferably, also, each arm 10 is slightly twisted in order to incline it toward the rear at its top edge, thus giving thereto an approximately plow shape.

The above described V-shaped guard is designed to press any person lying on the ground in front of a wheel, to one side or the other. If outwardly, the person is thrown clear of the wheel, but if inwardly, the life guard sweeps him up and preserves him from serious injury. The vertical inclination is for the purpose of keeping a person from being crowded beneath the arms 10. A hook 17 under the bar 7 and having its shank 16 pivotally supported at 18, locks the life guard away from the ground, as shown in Fig. 2.

From an intermediate point of the hook arm 16 passes a connecting rod 19 to the fender bar 20 supported a short distance in front of the supporting bar 3 by means of a broad but thin leaf spring 21. This spring is shown as curved upward, although I do not restrict myself to such an arrangement, and has its ends bolted or riveted to said bars 3 and 20.

This spring not only resiliently supports the fender bar, but acts by its normal outward pressure to retain the hook 17 drawn into engagement with the fender cradle and to keep it elevated.

When, now, any person is struck by the fender bar 20, the latter is forced slightly rearward, whether struck at its midlength or at either end, and acting through the connecting rod 19, the hook 17 is thrown out from its support of the fender cradle, the latter descends to the ground and whatever object is lying or standing thereon and by which the fender-bar was struck, is shielded from being run over by the car wheels.

In addition to the automatic trip provided by the fender bar 20, I attach a wire or chain 22 to the hook arm 16 and connect it in any convenient way to a means in reach of the chauffeur, so that the moment he sees a child or other person lying upon the ground in his path, or moving across the road in danger of being struck, he can instantly withdraw the hook 17 from its engagement with the fender cradle and so permit the latter to drop to the ground in readiness to shield the person from the wheels.

Although I prefer the single-standard form of my invention as above described, and as best adapted for light automobiles, yet for trucks and other heavy cars I consider the double standard form preferable. This is illustrated in Figs. 3 to 5, and comprises the two tubular standards 23 attached to the ends of the side beams 2, each having a post 24 slidable therein, and having the fender cradle attached to their lower ends constructed substantially like the one first described. Instead of having the standards 23 tubular, I prefer to form them of channel iron, providing a brace 25 for each. The posts 24 are extended for a distance above the standards about equal to the drop of the fender to the ground, and from end to end of the two extensions extends a cross bar 26 with which engages the notch of a detent 27 pivotally supported by a cross bar 29 attached to the chassis frame.

The fender bar 20 is connected with the detent 27 by a bent rod 30, as shown in Fig. 3, so that the rearward pressure applied to the fender bar will disengage the detent from the bar 26 and permit the fender cradle to descend to the ground.

What I claim is:

1. The combination with a vehicle, of a safety appliance comprising a single tubular standard rigidly supported by the vehicle in a substantially vertical position midway of the front wheels thereof, an elongated member slidable in said standard, a life guard attached to the lower end of said member and adapted to come in front of said wheels, means for keeping said member from turning in said standard while permitting its easy vertical play therein, means for holding said member and life guard elevated, and means both automatic and manually operated for releasing said member from said holding means and permitting the life guard to descend to the ground.

2. The combination with a power vehicle, of a single tubular standard square in cross section rigidly supported by the vehicle in a vertical position midway of its front end, a square bar slidable in said standard but not rotatable therein, a life guard comprising oppositely reaching horizontal arms attached to the lower end of said bar, a contact bar yieldingly supported by the vehicle in front thereof, a detent for locking the bar and life guard elevated, and means connected with said contact bar and said detent whereby a blow against any part of said bar will release the bar and life guard from said detent and permit the life guard to descend to the ground.

3. The combination with a power vehicle having a chassis frame and front steering wheels, of a cross member fastened at its ends to the side members of said frame, a square tube depending rigidly from said cross member, a bar slidable but not rotatable in said tube, a life guard rigidly attached to the lower end of said bar and extending laterally in front of said wheels, a hook having an elongated stem pivotally supported at its upper end, the hook being at its lower end and disposed to come beneath the end of said bar and thereby support the latter and the life guard spaced from the roadway, and means for releasing the bar and life guard from said hook and permitting the life guard to descend to the roadway.

4. A life guard for vehicles, comprising a single vertical standard rigidly supported midway of the front of the vehicle, a life guard carried by said standard to slide vertically but not rotatively, and an easily removable lock for temporarily holding the life guard elevated.

5. A life guard for vehicles, comprising a single vertical standard rigidly supported by the vehicle midway of its front, a life guard slidably but not rotatively supported by said standard, and a removable lock for holding the life guard elevated, the life guard having laterally extending arms, each arm being formed with an elbow near its outer end adapted to lie in front of the vehicle wheel at that side.

6. A life guard for vehicles, comprising a pair of arms located in a substantially horizontal plane and reaching obliquely forward from a point midway of the vehicle's front, each arm having an oblique elbow, a tie-bar attached at its ends to the arms midway of their length, and a strap attached at its ends to the midlength of said tie-bar and to the juncture of said arms respectively.

7. In a life guard for vehicles, the combination with a vertically movable life guard and means for locking it in an elevated position, of a transverse contact bar, a sheet metal supporting member attached at its ends to said bar and to a supporting means provided therefor, this sheet metal member being resilient and curved into an approximately U-form to permit the bar to yield to any rearward pressure applied thereto, and a connection between the center of said bar to said locking means whereby any rearward yielding of the bar will release the life guard from said locking means.

In testimony that I claim the foregoing invention, I have hereunto set my hand this 5th day of July, 1919.

LOWELL MASON MAXHAM.